United States Patent [19]

Wentzel et al.

[11] Patent Number: 4,706,136

[45] Date of Patent: Nov. 10, 1987

[54] METHOD FOR CONTROLLING A MAGNETIC DISK MEMORY

[75] Inventors: Peter Wentzel, Augsburg; Erich Huber, Fuerstenfeldbruck; Eckardt Weiss; Florian Achatz, both of Munich, all of Fed. Rep. of Germany

[73] Assignee: Siemens Aktiengesellschaft, Berlin and Munich

[21] Appl. No.: 840,049

[22] Filed: Mar. 17, 1986

[30] Foreign Application Priority Data

Mar. 18, 1985 [DE] Fed. Rep. of Germany ........ 3509744

[51] Int. Cl.$^4$ ................................................ G11B 5/09
[52] U.S. Cl. ........................................ 360/39; 360/53
[58] Field of Search ............................. 360/39, 53, 54

[56] References Cited

U.S. PATENT DOCUMENTS 3,771,143 11/1973 Taylor ............................. 340/172.5
4,405,952 9/1983 Slakmon .............................. 360/54
4,558,446 12/1985 Banba .................................. 360/53

FOREIGN PATENT DOCUMENTS 0127311 12/1984 European Pat. Off. .

OTHER PUBLICATIONS

Wilken, "Two High-Capacity Disc Drives", 1226 Hewlett-Packard Journal, vol. 35, No. 1, Jan. 1984.
Dohermann, "Defect Skipping . . . Devices", IBM Technical Disclosure Bulletin, vol. 19, No. 4, Sep. 1976, pp. 1424–1426.
Boscove et al., "Scattering of . . . Storage Devices", IBM Technical Disclosure Bulletin, vol. 25, No. 10, 1983, pp. 5193–5194.
Seisakusho, "Controlling System for a Rotating Storage Device", Japanese Patent Abstract 56-1967393, 6/11/83.
Fujitsu, "Defect Avoiding Mechanism" Japanese Patent Abstract 56-197080, 6/11/83.
Kitamura, "Format System of a Disk Drive", Japanese Patent Abstract 57-145676.
Takeshitz, "Defective Sector Replacement System", Japanese Patent Abstract 53-111007.
Watkinson, "Data Integrity in Disc Drives", Wireless World, vol. 39, No. 1564, Jan. 1983, pp. 76–78.

Primary Examiner—Vincent P. Canney
Attorney, Agent, or Firm—Hill, Van Santen, Steadman & Simpson

[57] ABSTRACT

The storage tracks lying respectively above one another in a disk pack and yielding a cylinder are divided into sectors, whereby a respective plurality of sectors have one respective alternate sector assigned thereto, the latter serving as a useful sector in case a defective sector occurs along the track. The assignment of the defective sectors to the alternate sectors is controlled in such a manner that every occurring defective sector effects a shift of the defective sector and of the following sectors by respectively one sector up to the respectively next, following alternate sector, the shift amplitude after every alternate sector being reduced by one sector length or, respectively, to zero and, in turn, corresponding increased at every following defective sector within the cylinder up to the next alternate sector following thereupon.

5 Claims, 10 Drawing Figures

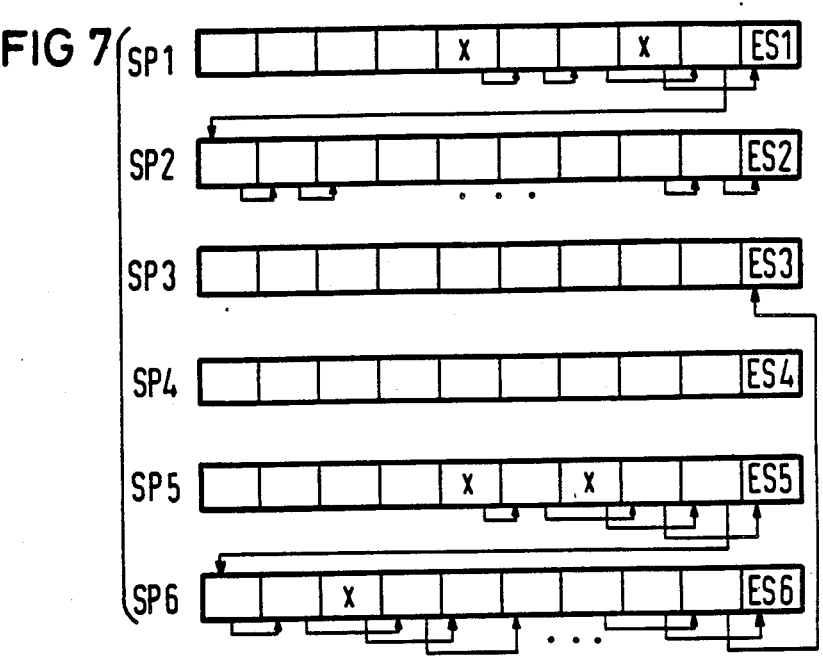
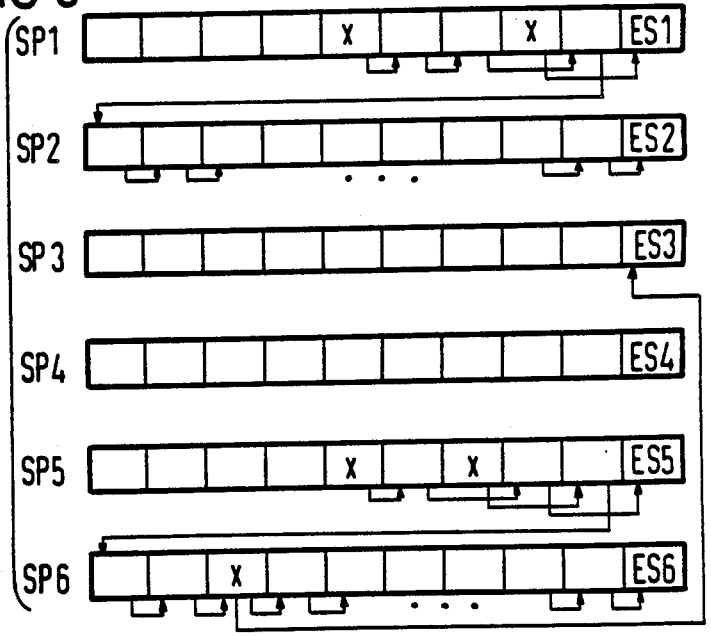

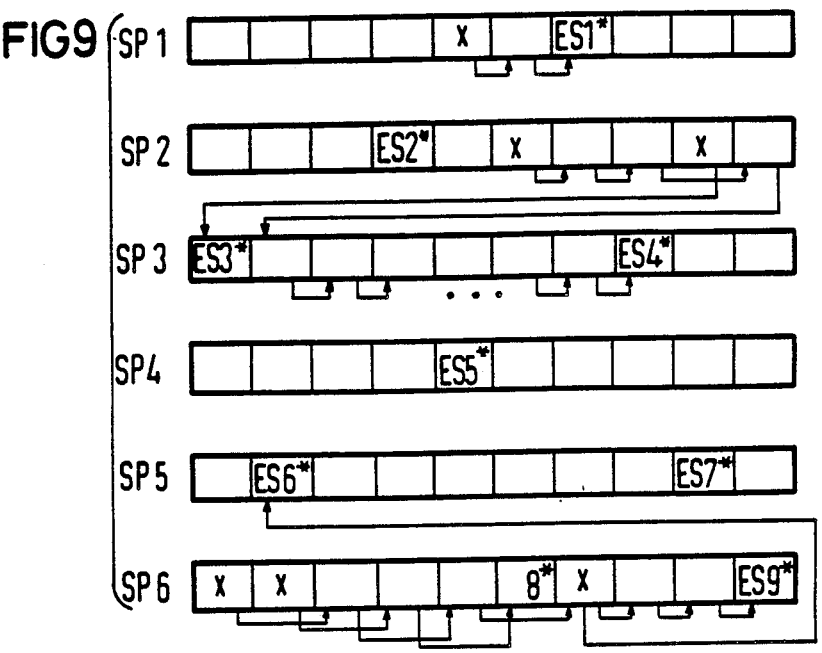
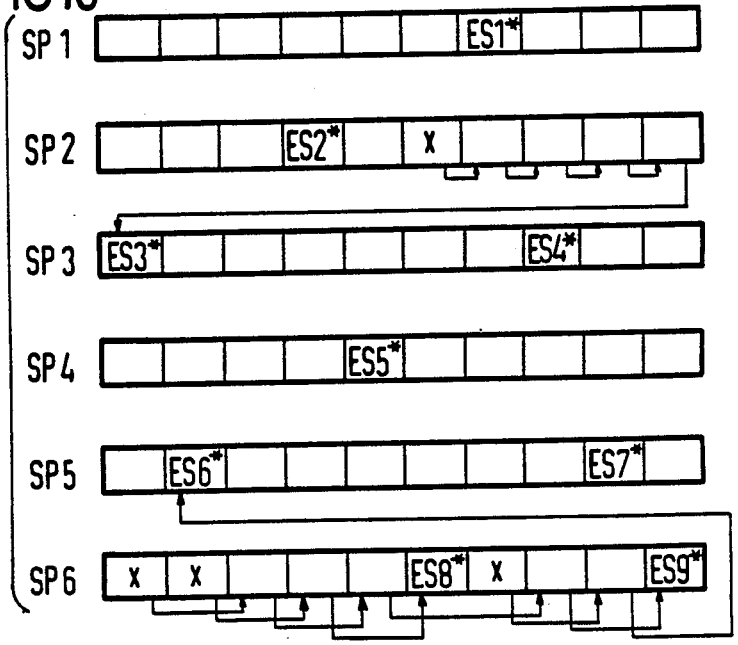

METHOD FOR CONTROLLING A MAGNETIC DISK MEMORY

BACKGROUND OF THE INVENTION

1. Field of the Invention

The present invention relates to a method for controlling a magnetic disk memory which comprises a plurality of magnetic disks seated on a common rotational axis, the magnetic disks respectively having concentrically arranged tracks, and a plurality of magnetic heads respectively assigned to a disk surface and arranged in a radially reciprocating fashion via a common positioning device, whereby the respective tracks arranged above or below one another and all belonging to the disk surfaces are combined to form a respective cylinder and all magnetic heads are positionable in common to respectively one of the cylinders and whereby each track is subdivided into individual sectors respectively comprising a header label and a data field and an alternate sector is assigned to a plurality of sectors and serves as a useful sector in case of a defective sector occurring along the track.

2. Description of the Prior Art

It is known in magnetic disk memories to divide the concentrically arranged tracks into a plurality of sectors and to provide an alternate sector per track which can be accessed as needed. In the method known from the IBM Technical Disclosure Bulletin, Vol. 25, No. 10, March 1983, pp. 5193-5194, for example, the assignment of the alternate sectors occurs such that a sector recognized as defective and the following sectors are respectively shifted by one sector toward the end of the track, are renumbered, rewritten and appropriately identified, whereby the last useful sector is shifted into the immediately adjoining alternate sector within the same track. Since only a single alternate sector is provided per track, this displacement method can only be employed in the case of a single defective sector within the track. Given a second defective sector within the track, there is then only the possibility of externally transferring the second defective sector directly into a free, unused alternate sector in another track. This, however, necessarily causes a considerable loss of performance of the disk memory system since, due to the fact that a skip at the second defective sector from the original track onto the alternate sector in another track and, under given conditions, a return onto the original track subsequently occurs, an additional revolution of the disk is required, this involving a considerable loss of time.

SUMMARY OF THE INVENTION

The object of the present invention, therefore, is to provide a method of controlling a magnetic disk memory such that, given magnetic disks having more than two defective sectors per track, an assignment of corresponding alternate sectors is realizable with the lowest possible time or, respectively, performance loss.

The above object is achieved, according to the present invention, for a magnetic disk memory of the type set forth above, and is particularly characterized in that every occurring defective sector effects a shift of this defective sector and of the following sectors by one sector up to the respectively next, following alternate sector; and in that the shift amplitude is reduced by one sector length after every alternate sector or, respectively, is reduced to zero and is, in turn, correspondingly increased at every following defective sector within the cylinder up to the next alternate sector following thereon.

BRIEF DESCRIPTION OF THE DRAWINGS

Other objects, features and advantages of the invention, its organization, construction and operation will be best understood, from the following detailed description, taken in conjunction with the accompanying drawings, on which:

FIG. 3 shows a known method for assigning alternate sectors; and

FIGS. 4-10 illustrate various alternatives for the assignment of alternate sectors in accordance with the present invention.

DESCRIPTION OF THE PREFERRED EMBODIMENTS

Figure 1:
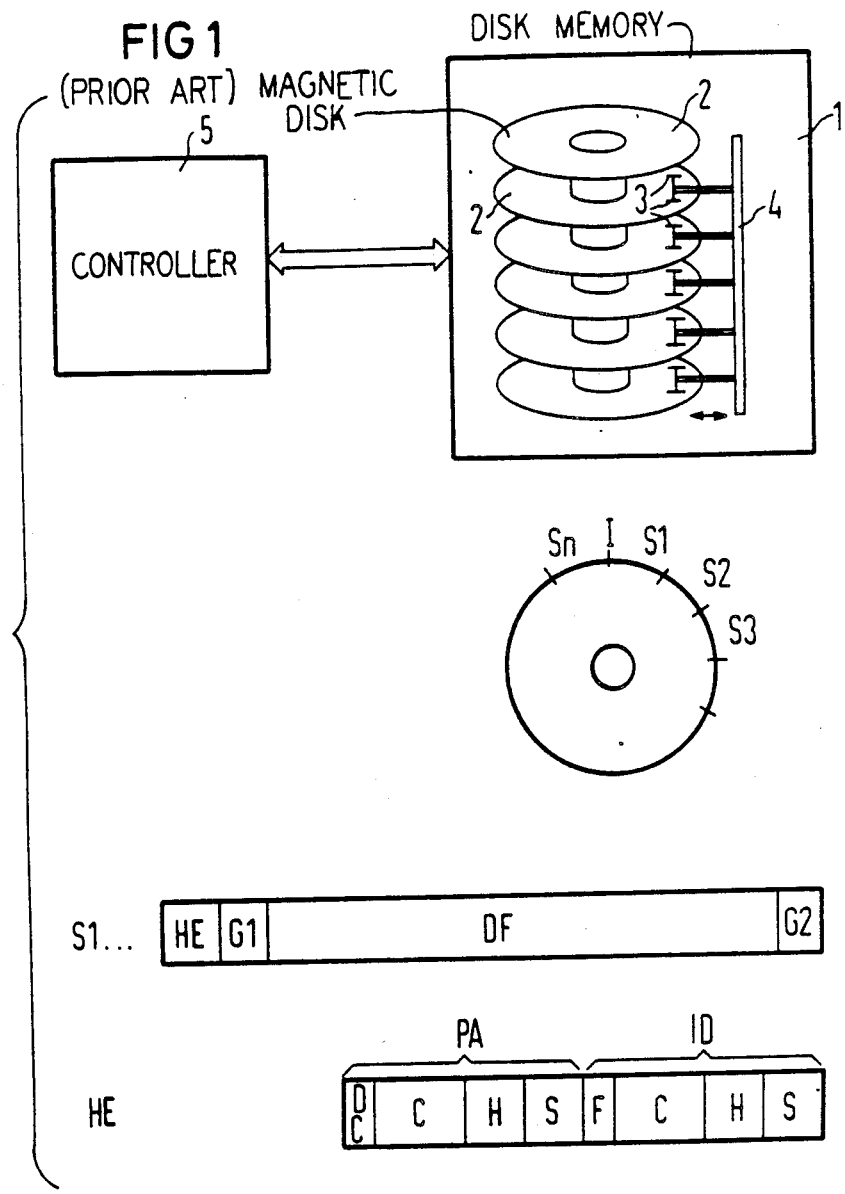
FIG 1 is a schematic representation which illustrates the principle of a magnetic disk memory having an appertaining control unit.
Figure 2:
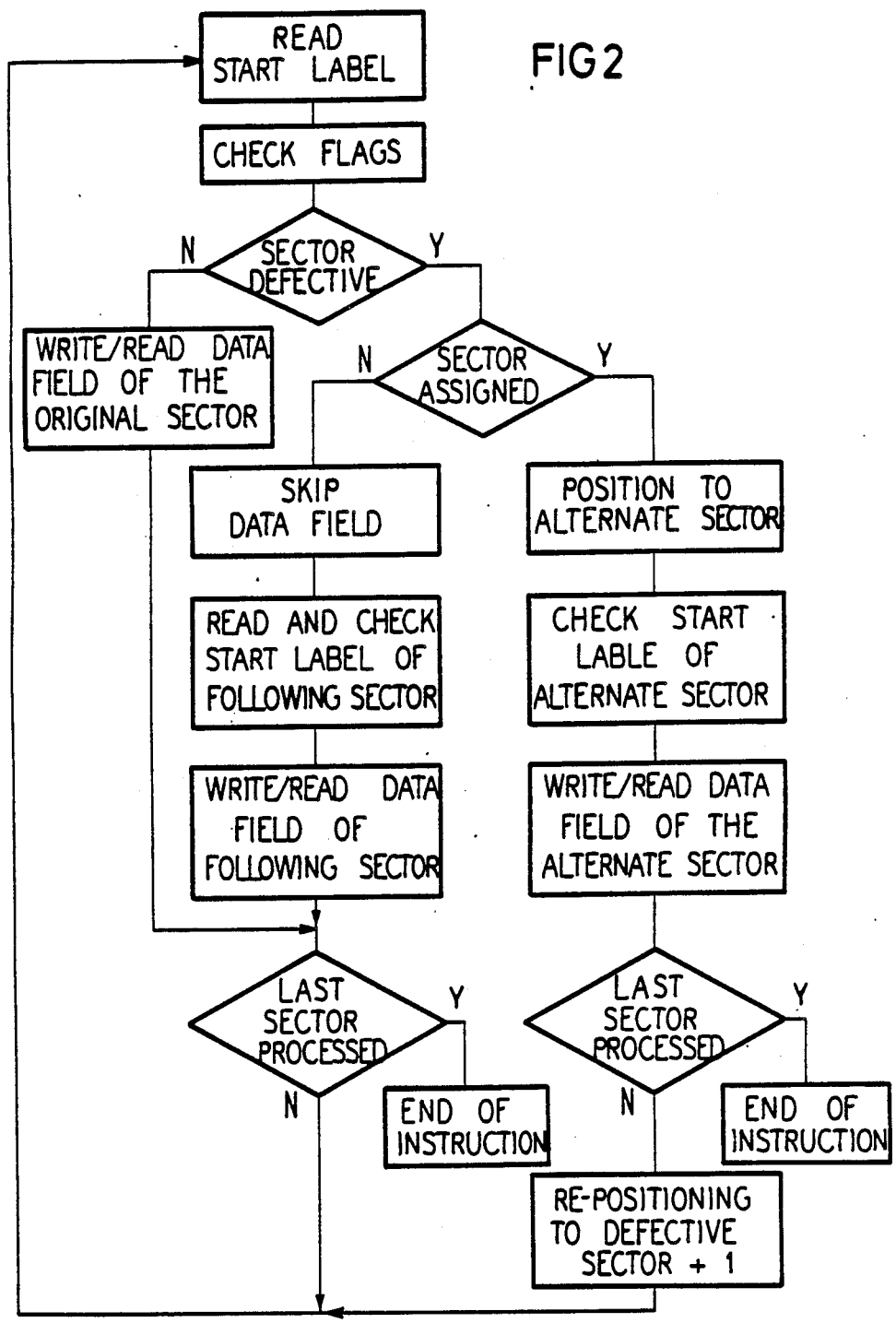
FIG. 2 is a flow chart showing the process execution for a magnetic disk memory controller of the type set forth in FIG. 1.

FIG. 1 illustrates a magnetic disk memory 1 comprising a plurality of magnetic disks 2 seated on a common axis of rotation and a plurality of magnetic heads 3 each assigned to a respective disk surface. The magnetic heads 3 can be moved in a radially-reciprocating fashion by way of a common positioning drive 4 and are therefore respectively alignable to a cylinder, i.e. to tracks lying respectively above or below one another. Beginning with an index I, the tracks concentrically arranged on the magnetic disk 2 are subdivided into a plurality of sectors S1, S2, S3, ... Sn, as shown in FIG. 1, which, in turn, contain a header label HE and a data field DF limited by two block gaps G1, G2 as shown in FIG. 1. The header label HE is divided in two, as shown in FIG. 1, and the left portion contains the physical address PA with a distance counter DC (1 half byte), cylinder address c (3 half bytes), head address H (2 half bytes) and sector address S (2 half bytes). The right portion contains a logic address ID which is likewise composed of a cylinder address C, a head address H and a sector address S and contains additional identifier bits referred to as flags F. The physical address PA indicates the actual location on the disk memory, i.e. the number of the cylinder, the number of the head or of the track and the number of the sector. The logic address, by contrast, contains a logical sequence in terms of value in which only actually utilized blocks are enumerated. A controller 5 is connected to the magnetic disk memory 1, the controller 5 controlling the overall process execution, for example in accordance with the flow chart of FIG. 2.

Figures 3, 4:
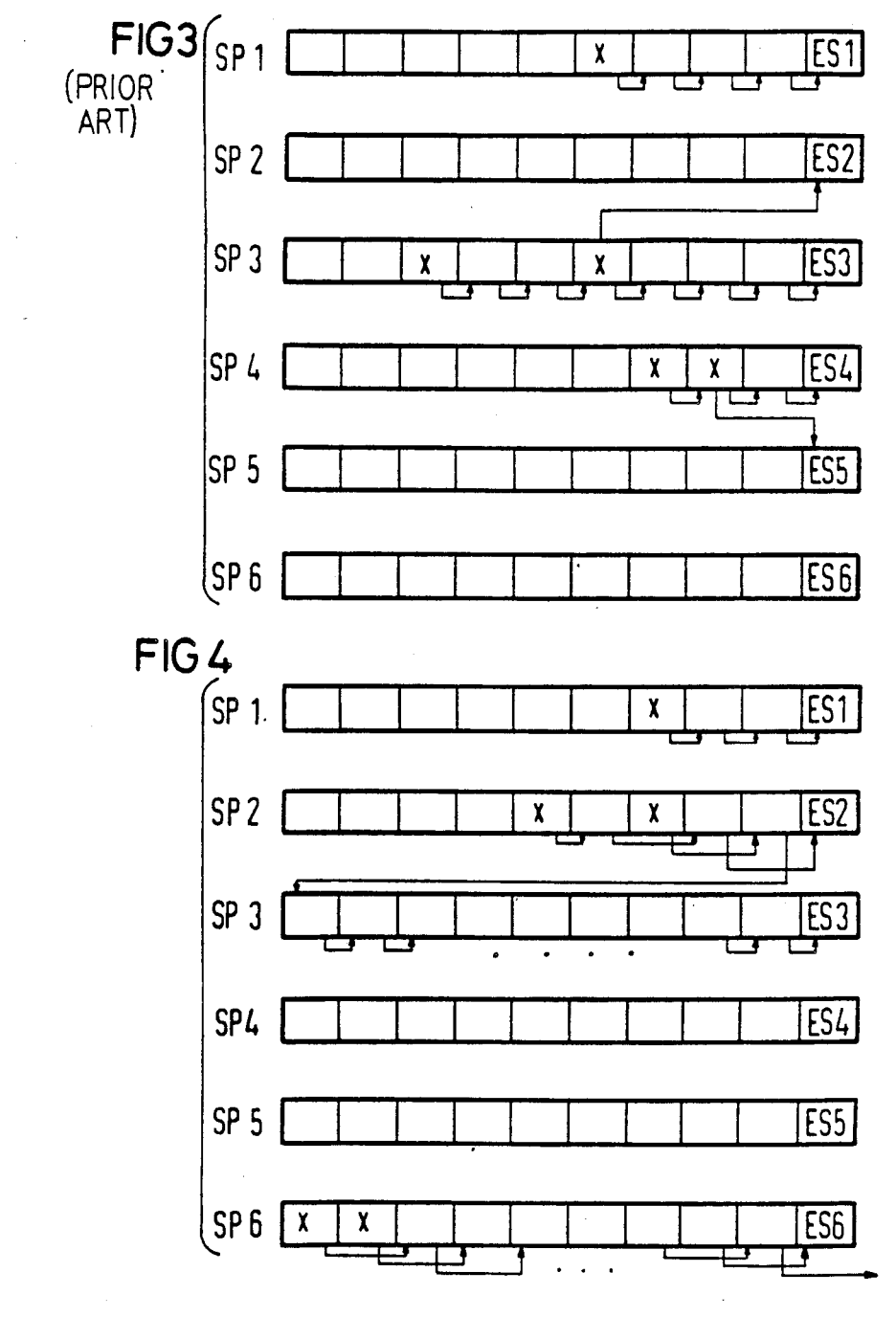

Details of a known method for the assignment of alternate blocks, as well as a number of alternatives of the present invention, may be seen in FIG. 3 and, respectively, FIGS. 4-10. The individual examples respectively show six tracks SP1 ... SP6 belonging to a common cylinder, these six tracks being respectively subdivided, in turn, into ten sectors each.

In accordance with the example of a known assignment system shown in FIG. 3, one respective alternate sector ES1..ES6 is provided at the end of every track. When, as may be seen in the track SP1, a defect occurs in a single sector (see the sector marked x), then no data are recorded in this sector. The notice that this sector is unusable is merely deposited in the appertaining header label HE. The data which would reside in this sector per se and then shifted into the next sector in accordance with the arrows shown in FIG. 3 and the data of the next sector proceed into the next following sector, etc., so that the data of the last useful sector finally proceed into the alternate sector ES1. When, as may be seen in the example of the third and fourth tracks SP3, SP4, two defective sectors occur along a track, the data of the first defective sector and those of the following sectors are respectively shifted by one sector in accordance with the example in the first track SP1, whereas the second defective sector is immediately transferred into an alternate sector of another track within the same cylinder, that is into the alternate sector ES2 of the second track SP2 or, respectively, into the alternate sector ES5 of the fifth track SP5. A corresponding identifier bit or flag in the header label HE of the second defective sector signals that this sector is defective and that the corresponding data have been transferred out. The header label HE also contains the address of the alternate sector. When reading the third track SP3, a skip into the alternate sector ES2 of the second track SP2 is now necessary at the location of the second defective sector. Since this alternate sector ES2 is offset by four sectors relative to the region of the defective sector, waiting must occur until the alternate sector ES2 comes into the region of the read head. After processing the data field in this alternate sector, a return to the original track occurs into the sector immediately following the second defective sector, whereby the twice-repeated track skip additionally requires a full disk revolution. What is essential is that the alternate sector in the other track is useable, this ultimately meaning that this track must not have any defective sector itself. Defect-free tracks are previously identified in the formatting of the disk memory, whereby, so to speak, a book is kept regarding the condition of the full storage region.

A first alternative of an assignment method in accordance with the present invention for alternate sectors is illustrated in FIG. 4. This alternative is related to the method of FIG. 3, but differs in that no external transfer into an alternate sector of another track is not initially required even given two or more defective sectors per track. As the example in the second track SP2 shows, it is not only the first defective sector but also the second defective sector which are shifted within the track, whereby the shift amplitude indicated in the distance counter DC of the header label HE corresponds to the number of defective sectors and remains unaltered until the next, following alternate sector ES2. The shift mode is continued into the next, third track SP3 in which the shift amplitude is reduced by a sector following the alternate sector ES2 because a shift sector of the second track SP2 has been deposited in the alternate sector ES2 in the meantime. Since no further defective sector occurs in the third track SP3, the individual sectors are shifted with unchanging shift amplitude by respectively one sector to the end of the track and the alternate sector ES3 provided at the end of the third track is filled.

The corresponding alternate sectors ES4, ES5 in the fourth and fifth tracks SP4, SP5 remain unused because no defective sectors are present here. By contrast, the two defective sectors in the sixth track SP6 elicit a corresponding great shift amplitude with the result that only the penultimate useful sector can be shifted into the alternate sector ES6 at the end, whereas the last useful sector must be transferred out into an alternate block outside of the cylinder. Although such a case only occurs when the number of defective sectors occurring in the remaining tracks is higher than the number of alternate sectors available in these remaining tracks, it does mean a considerable loss of performance for the disk memory system because of the necessary positioning motion into another cylinder.

An advantageous feature occurs on the basis of the measures illustrated in FIG. 5, which differ from the exemplary embodiment of FIG. 4 in that two further alternate sectors ES7, ES8 are offered in the last track SP6 in addition to the alternate sector ES6 which is usually present. Although these additional alternate sectors ES7, ES8 reduce the number of useful sectors, they offer the advantage that, even given greater shift amplitudes due to the multiple occurrence of defective sectors in the last tracks, all sectors to be shifted into alternate sectors can be accommodated within the cylinder with great probability and an external transfer into another cylinder with the position changes required for that purpose can be avoided.

Since, in the exemplary embodiments of FIGS. 4 and 5, alternate sectors remaining free in preceding tracks cannot be accessed even though they are unused (see ES4, ES5 in FIG. 4 and ES3, ES4 in FIG. 5), the exemplary embodiment illustrated in FIG. 6 provides that all alternate sectors be combined to form a closed group and be arranged at the end of the last track SP6. This technique has the advantage that all alternate sectors within the cylinder are utilized given a corresponding number of defective sectors, but has the disadvantage that every defective sector results in a shift of the following sectors to the end of the cylinder. Analogous to the samples of FIGS. 4 and 5, a plurality of defective sectors cause a corresponding great shift amplitude.

In comparison to the alternative of FIG. 4, the exemplary embodiment shown in FIG. 7 offers a further advantage insofar as an external transfer of sectors from the last track SP6 into free alternate sectors of preceding tracks as possible, for example into the alternate block ES3.

The example shown in FIG. 8 essentially corresponds to the example shown in FIG. 7. The difference here is only that a defective sector occurring in the last track SP6 does not lead to a shift of the following blocks, possibly with an increase in the shift amplitude, but that this defective sector is externally transferred directly into a free alternate sector in one of the preceding tracks, for example in the alternate sector ES3.

Given the exemplary embodiment of FIG. 9, the entire storage space per cylinder is subdivided into individual shift units which do not correspond to the full length of a track. Instead of ten sectors including the alternate sector, shift units of seven sectors each including the alternate sector are formed in the present example. This allows an optimized distribution of the individual alternate sectors onto the various sector positions and has the advantage that, given an external transfer of a defective useful sector from the last track SP6 into an unused alternate sector in a preceding track, the respectively nearest (as seen in the rotational direction) free alternate sector can be employed, the alternate sector E6* present in the fifth track SP5 in the present example. Even more favorably positioned alternate sector ES3* is already occupied and therefore does not come into consideration.

The examplary embodiment illustrated in FIG. 10 largely corresponds to the embodiment of FIG. 9, The difference is only in that the defective sector occurring in the last track SP6 is not immediately transferred out in a free alternate sector, but is involved in the shift mode. Analogous to the exemplary embodiment of FIG. 7, the result of this is that the last useful sector is transferred out into the respectively nearest, free alternate sector (as seen in the rotational direction).

The methods of FIGS. 7 and 10, however, can only be implemented when the address of the logically following sector is contained in the header label of every sector. In comparison to the header label HE set forth in conjunction with FIG. 1d, this denotes a modification insofar as the logical address ID of the current sector is replaced by that of the following sector. Foregoing the logical address of the current sector is possible because the logical address of the sector to be currently processed is already unequivocally defined by the physical address PA including shift amplitude contained in the distance counter DC.

Although we have described our invention by reference to particular embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for controlling a magnetic disk memory which comprises a plurality of magnetic disks seated on a common axis of rotation, each magnetic disk comprising a plurality of concentric storage tracks on their surfaces, the storage tracks of the disks being aligned to form storage cylinders, a plurality of magnetic heads each adjacent a respective disk surface, and a position controller connected to and operable to commonly position the magnetic heads selectively to a respective cylinder, each of the tracks being divided into a plurality of useful sectors and an alternate sector, and each sector comprising a header and a data field each alternate sectors serving as a useful sector in case of a defective useful sector along a track, comprising the steps of:

shifting the information of a defective sector and of the following sectors by one sector to the next up to a following alternate sector; and reducing the amount of shift after every alternate sector, and increasing the amount of shift at each following defective sector within a cylinder to the next following alternate sector.

2. The method of claim 1, comprising the step of:

providing and combining a plurality of alternate sectors into a sequentially occurring group in a track.

3. The method of claim 3, wherein the step of providing and combining is further defined as:

combining the alternate sectors at the last track at an end region of the respective cylinder.

4. The method of claim 3, and further comprising the step of:

transferring the information of useful sectors in the last track to an alternate sector in another track of the cylinder when the amount of shift required in the last track of the end region of the cylinder is greater than the number of alternate sectors in the last track of the cylinder.

5. The method of claim 4, and further comprising the step of:

transferring the information of a newly appearing defective sector in the last track to an unused alternate sector in another track when the alternate sectors of the group cannot receive shifted information.

* * * * *